United States Patent [19]

Williams, Jr. et al.

[11] Patent Number: 4,548,482

[45] Date of Patent: Oct. 22, 1985

[54] REFLECTOR WITH EASILY REPLACEABLE REFLECTIVE MEMBRANE

[75] Inventors: Carl L. Williams, Jr.; Larry R. Payne, both of Abilene, Tex.

[73] Assignee: LaJet Energy Company, Abilene, Tex.

[21] Appl. No.: 484,216

[22] Filed: Apr. 12, 1983

[51] Int. Cl.$^4$ .......................... G02B 7/18; G02B 5/10
[52] U.S. Cl. ..................................... 350/608; 350/607
[58] Field of Search ...................... 350/295, 608, 607

[56] References Cited

U.S. PATENT DOCUMENTS

| | | | |
|---|---|---|---|
| 1,730,574 | 10/1929 | Holub . | |
| 2,659,272 | 11/1953 | Goldmann | 88/104 |
| 2,733,637 | 2/1956 | Joseph | 88/96 |
| 2,794,360 | 6/1957 | Eagle | 88/1 |
| 2,952,189 | 9/1960 | Pajes | 88/73 |
| 3,054,328 | 9/1962 | Rodgers | 88/73 |
| 3,514,776 | 5/1970 | Mulready | 343/6 |
| 3,527,527 | 9/1970 | Manowitz | 350/295 |
| 3,610,738 | 10/1971 | Bochmann | 350/295 |
| 3,623,796 | 11/1971 | Schweiger | 350/295 |
| 3,656,830 | 4/1972 | Kurschner | 350/67 |
| 4,033,676 | 7/1977 | Brantley, Jr. et al. | 350/295 |
| 4,046,462 | 9/1977 | Fletcher et al. | 350/295 |
| 4,179,193 | 12/1979 | Gillette et al. | 350/295 |
| 4,288,146 | 9/1981 | Johnson, Jr. et al. | 350/295 |
| 4,312,326 | 1/1982 | Johnson, Jr. | 126/424 |
| 4,422,723 | 12/1983 | Williams, Jr. et al. | 350/295 |

FOREIGN PATENT DOCUMENTS

| | | | |
|---|---|---|---|
| 2322209 | 11/1974 | Fed. Rep. of Germany | 350/288 |
| 2631551 | 2/1978 | Fed. Rep. of Germany | 350/295 |
| 987195 | 3/1965 | United Kingdom . | |

OTHER PUBLICATIONS

J. C. Muirhead, "Variable Focal Length Mirrors", Review of Scientific Instruments, vol. 32, No. 2, Feb. 1961, pp. 210-211.

*Primary Examiner*—Jon W. Henry
*Attorney, Agent, or Firm*—Roylance, Abrams, Berdo & Goodman

[57] ABSTRACT

A reflector for electromagnetic radiation with an easily replaceable reflective membrane that is especially useful in solar collectors. The reflector comprises an annular housing, an elastic reflective membrane, a ring supporting the membrane, an evacuation assembly for evacuating the housing and drawing the elastic membrane into the housing, and a fastening assembly which releasably snap-fits the ring and membrane assembly to the housing in a gas-tight manner.

18 Claims, 5 Drawing Figures

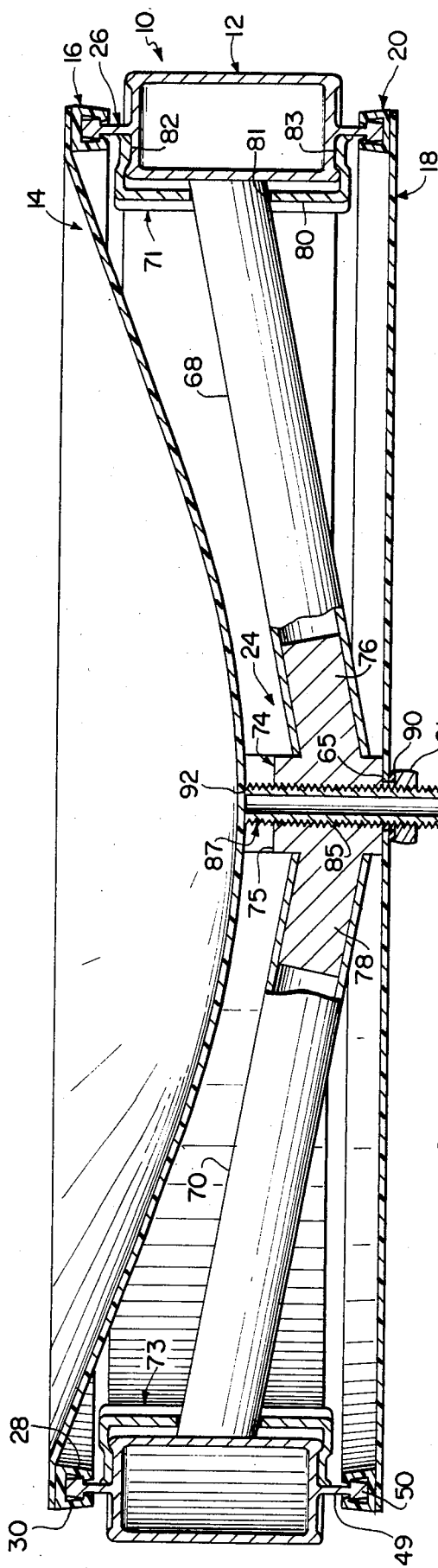
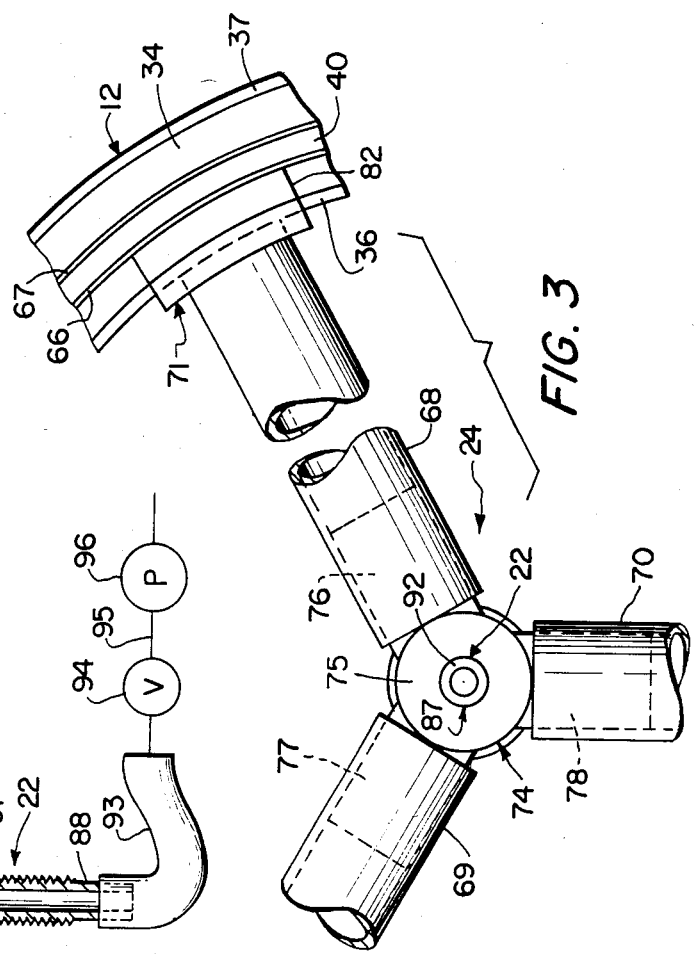
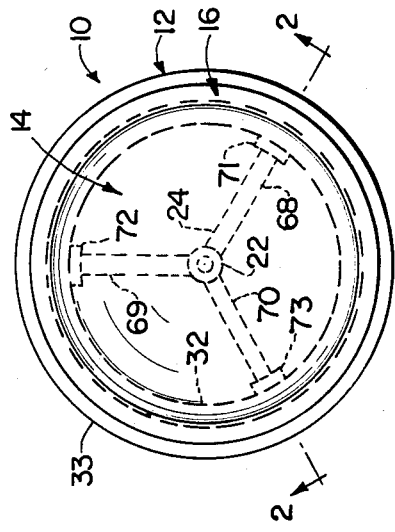

REFLECTOR WITH EASILY REPLACEABLE REFLECTIVE MEMBRANE

FIELD OF THE INVENTION

The invention relates to a curved reflector for electromagnetic radiation, such as solar radiation, having an easily replaceable reflective membrane. The reflector comprises an annular housing, an elastic reflective membrane, a ring supporting the membrane, an evacuation assembly for evacuating the housing and drawing the elastic membrane into the housing, and a fastening assembly which releasably snap-fits the ring and membrane assembly to the housing.

BACKGROUND OF THE INVENTION

In constructing a system for utilizing solar energy, it is highly advantageous to provide a curved solar reflector that can concentrate the solar energy and aim that concentrated energy at a specific target. This results in a more efficient system and can reduce the size and cost of the overall system.

While various curved solar reflectors, and curved reflectors of other electromagnetic radiation, have been known in the art, they have tended to be heavy and expensive to make. In addition, they have tended to be prone to breakage, require periodic polishing and are costly and complicated to replace. The high cost of replacing reflectors not only includes the material itself but also expensive labor costs.

Some of these prior art reflectors are formed from mirrored glass, polished metal or elastic membranes. These membranes have a reflective surface which is placed in a curved position by means of partially evacuating the housing supporting the membrane. Examples of the elastic membrane type are disclosed in U.S. Pat. Nos. 2,952,189 to Pajes; 3,623,796 to Schweiger; 4,033,676 to Brantley, Jr. et al; 4,046,462 to Fletcher; 4,179,193 to Gillette et al; 4,288,146 to Johnson, Jr. et al; and 4,312,326 to Johnson, Jr. as well as the article entitled "Variable Focal Length Mirrors", Review of Scientific Instruments, Vol. 32, No. 2, February, 1961, pages 210-211, by J. C. Muirhead. Another example of such an adjustable reflector is disclosed in U.S. Pat. No. 4,422,723 to Williams, Jr. et al.

Additional mirrors or reflectors relevant to the present invention are disclosed in the following U.S. Pat. Nos. 1,730,574 to Holub; 2,659,272 to Goldmann; 2,733,637 to Joseph; 2,794,360 to Eagle; 3,054,328 to Rogers; 3,514,776 to Mulready; 3,527,527 to Manowitz; 3,610,738 to Bochman; and 3,656,830 to Kurschner. In addition, German Pat. Nos. 2,322,209 and 2,631,551 and United Kingdom Pat. No. 987,195 are relevant to the present invention.

SUMMARY OF THE INVENTION

Accordingly, a primary object of the invention is to provide an adjustable reflector with an easily replaceable reflective membrane that is inexpensive to manufacture and replace.

Another object of the invention is to provide such a reflector that is relatively simple to manufacture, durable and light-weight.

Another object of the invention is to provide such a reflector that includes a reflector assembly comprising a ring supporting an elastic reflective membrane that can be snapped onto and off the reflector housing quickly, easily and without a high degree of skill or complicated tools.

Another object of the invention is to provide such a reflector that can be easily and accurately curved by means of an evacuation assembly requiring little skill.

The foregoing objects are basically attained by providing a reflector comprising an annular housing having an open end; a ring; a reflective, elastic membrane spanning the interior of the ring; a mechanism for attaching the membrane to the ring in a gas-tight manner; a releasable fastening assembly, on the ring and the housing, for coupling the ring to the housing to close the open end in a gas-tight manner and for positively interlocking said ring and housing to prevent accidental relative axial movement therebetween; and an assembly, coupled to the housing, for evacuating the interior of the housing to thereby draw the reflective membrane into the housing.

Advantageously, the invention further comprises a separately manufactured reflector assembly that is easily engaged and disengaged from the housing, the combination comprising a ring formed of resilient material; a reflective, elastic membrane spanning the interior of the ring; a mechanism for attaching the membrane to the ring in a gas-tight manner; and a pair of spaced downwardly projecting annular members, each annular member having a locking shoulder. Advantageously, the housing includes an upwardly projecting annular member which is snap-fit in between the downwardly projecting annular members in the ring.

Other objects, advantages and salient features of the invention will become apparent from the following detailed description which, taken in conjunction with the annexed drawings, discloses a preferred embodiment of the invention.

DRAWINGS

Referring now to the drawings which form a part of this original disclosure:

FIG. 1 is a top plan view of the reflector in accordance with the present invention;

FIG. 2 is an enlarged, front elevational view of the reflector in section taken along lines 2—2 in FIG. 1 showing the reflective membrane in a curved position;

FIG. 3 is an enlarged, top plan fragmentary view of the valve tube used for evacuating the housing, portions of the supporting struts and a portion of the top surface of the housing;

DETAILED DESCRIPTION OF THE INVENTION

Figure 4:
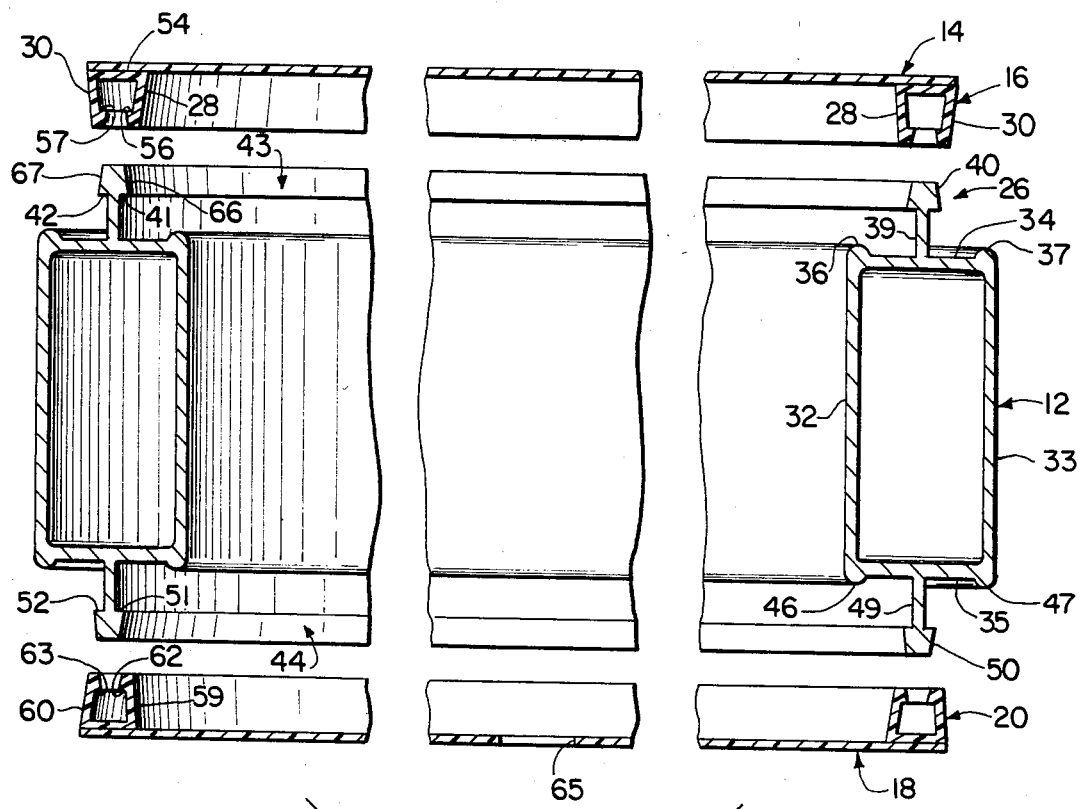
FIG. 4 is an enlarged, exploded front elevational view in section taken along the same line as FIG. 2 but showing only the housing as well as two reflector assemblies unconnected to the housing.

As seen in FIGS. 1-5, the reflector 10 in accordance with the invention comprises an annular housing 12, an elastic reflective membrane 14, a ring 16 coupled to the housing and supporting the reflective membrane, a second membrane 18 at the bottom of the housing, a second ring 20 coupled to the housing and supporting the second membrane, an evacuating assembly 22 for partially evacuating the interior of the housing to draw the reflective membrane 14 therein, and a support assembly 24 for supporting the evacuating assembly.

Figure 5:
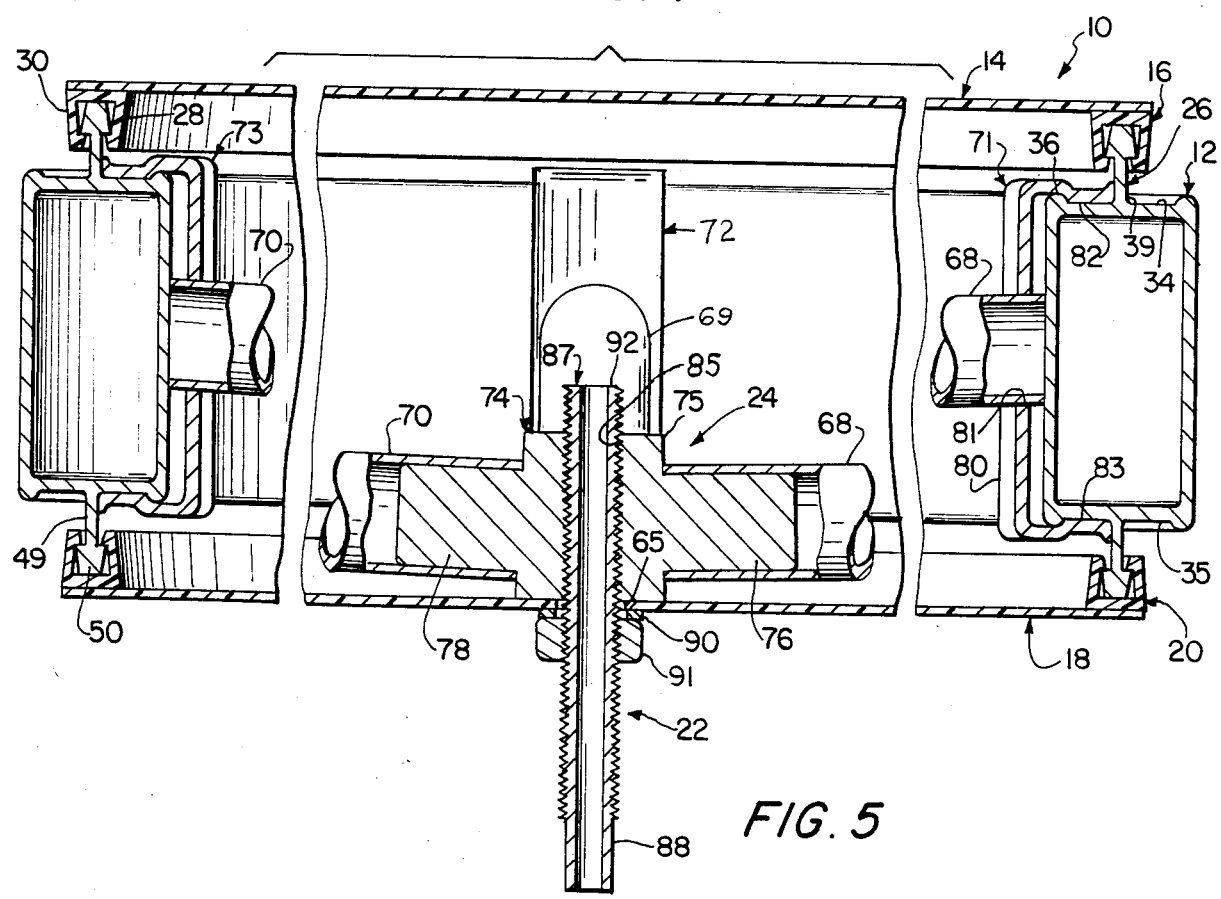
FIG. 5 is an enlarged, elevational view in section similar to that shown in FIG. 2 except that the elastic reflective membrane is in its undeformed position.

As best seen in FIGS. 2, 4 and 5, a fastening assembly is comprised of an upwardly projecting annular male fastening member 26 on the housing and a pair of downwardly projecting, resilient annular legs 28 and 30 coupled to the ring 16 which releasably and directly receive the male fastening member 26 therebetween in a snap-fit interlocking connection. Thus, the reflective assembly formed from the elastic reflective membrane 14 and ring 16 can be engaged or disengaged with the housing quickly and without complicated tools or a high degree of skill.

The annular housing 12 is advantageously formed from a tubular extrusion of aluminum having a substantially rectangular cross section, the tube being deformed into an annular configuration and connected at its ends by means of a toothed plug, not shown, located inside thereof to maintain the circular configuration. The housing has an inner cylindrical surface 32, an outer cylindrical surface 33, a top annular surface 34 and a bottom annular surface 35. Extending upwardly and integrally from the top surface 34 adjacent the inner and outer surfaces are a pair of annular ribs 36 and 37. Integrally formed with the housing and upwardly projecting from the top surface 34 is the annular male fastening member 26 which is comprised of an annular support 39 having a rectangular cross section and an annular flange 40 at the top of the support having an isosceles trapezoidal cross section with the smaller end being the distal end thereof. On opposite sides of the annular support 39 and formed on the bottom of the annular flange 40 are a pair of inner and outer downwardly facing, planar annular locking shoulders 41 and 42. The annular housing has a top open end 43 and a bottom open end 44 which define with inner cylindrical surface 32 a hollow interior cavity.

As best seen in FIG. 4, the annular housing 12 has integrally formed and extending from the bottom surface 35 a pair of inner and outer ribs 46 and 47 similar to ribs 36 and 37, and an annular support 49 similar to annular support 39. An annular flange 50 similar to flange 40 extends from support 49 and has a pair of inner and outer annular locking shoulders 51 and 52 which are upwardly facing.

As seen in FIG. 4, a separate snap-on and snap-off, easily replaceable reflective assembly is formed by the combination of the elastic reflective membrane 14 and the ring 16.

The elastic membrane 14 is formed from a thin polymeric material such as Mylar having a metalized reflective outer surface, such as that formed by coating with aluminum. The thickness of the membrane is in the range of 0.0005 to 0.002 inch. The membrane in plan view as seen in FIG. 1 is disc shaped and spans the interior of the ring 16. Advantageously, the membrane is rigidly fastened in a gas-tight manner to the top planar surface of the ring by means of ultrasonically welding the membrane directly to the ring.

The ring is advantageously formed of a polymeric extrusion and is resilient. The ring has a substantially U-shaped cross section and comprises a base 54 with a rectangular cross section and the pair of downwardly projecting, parallel and spaced inner and outer legs 28 and 30 which are integrally formed with the base. These legs comprise a female annular fastening member and have inner and outer outwardly facing annular, planar locking shoulders 56 and 57. As seen in FIG. 4, the inner locking shoulder 56 extends radially outwardly from inner leg 28 and the outer locking shoulder 57 extends radially inwardly from outer leg 30.

Advantageously, the width of the space between the inner and outer locking shoulders 56 and 57 on the ring is slightly smaller than the width of the annular flange 40 on the housing between the inner and outer extent of the locking shoulders 41 and 42 so that resilient legs 28 and 30 can be biased away from each other as the ring 16 is snapped over the annular flange 40 to connect the reflective assembly to the housing. To disconnect them, the outer leg 30 is outwardly flexed and the reflective assembly is pulled from the housing.

The height of annular flange 40 between its top surface and the locking shoulders 41 and 42 is substantially equal to the height inside the ring between the bottom of the base 54 and the locking shoulders 56 and 57, as best seen in FIG. 5. As indicated in FIGS. 2, 4 and 5, the radius of the annular flange 40 is chosen so that it can be fully received between the legs 28 and 30 in a snap-fit connection.

As seen in FIG. 4, a bottom assembly is formed by the second membrane 18 and the second ring 20 which are connected together in a gas-tight manner by means of ultrasonic welding. The second ring 20 has a pair of upwardly projecting legs 59 and 60 similar to legs 28 and 30 on ring 16, leg 59 having a downwardly facing annular planar locking shoulder 62 for engaging locking shoulder 51 on flange 50 and leg 60 having a downwardly facing annular planar locking shoulder 63 for engaging locking shoulder 52 on flange 50.

As is evident from FIGS. 2 and 5, the reflective assembly formed by ring 16 and membrane 14 when it is connected to the housing via flange 40 closes the upper open end 43 of the housing in a gas-tight manner. Similarly, the bottom assembly formed by the second ring 20 and the second membrane 18 is connected to the housing via annular flange 50 and closes the bottom open end 44 of the housing in a gas-tight manner. This is accomplished by means of the snap-fit and locking of the legs on each ring with the flanges 40 and 50.

As used herein, the phrase "snap-fit" means a mating of a first member having at least one resilient locking portion with a second member having at least one rigid locking portion by moving the first and second members relative to one another and, during such movement, biasing the resilient locking portion of the first member out of its relaxed initial configuration by engaging the resilient locking portion with the rigid locking portion of the second member and sliding it therealong, and then allowing the resilient locking portion to flex back substantially to its initial configuration when the first member is fully engaged on the second member, thereby interlocking the members.

In the present invention, rings 16 and 20 each comprises a first snap-fitting member having, via legs 28 and 30 and legs 59 and 60 as well as their locking shoulders, two resilient locking portions and flanges 40 and 50 each comprises a second snap-fitting member having two rigid locking portions including their locking shoulders 41 and 42, and 51 and 52.

In snap-fitting ring 16 to flange 40, for example, legs 28 and 30 are outwardly biased as they slide along the inner and outer tapering surfaces 66 and 67 on flange 40, and then are allowed to flex back to their initial configuration when they are fully engaged on the flange 40 and the top of the flange engages the bottom of the ring base 54 as seen in FIG. 5.

In this fully engaged position, upwardly facing locking shoulder 56 directly engages and interlocks with downwardly facing locking shoulder 41, and upwardly facing locking shoulder 57 directly engages and interlocks with downwardly facing locking shoulder 42 in fastening ring 16 to the housing. Similarly, shoulders 51 and 62 as well as shoulders 52 and 63 directly engage and interlock in fastening ring 20 to the housing. Thus, these locking shoulders form locking assemblies for mechanically, directly and positively interlocking the rings to the housing to prevent accidental relative axial movement therebetween, which could be instigated by violent surges of wind. This positive interlocking avoids the use of an adhesive connection, which would make the parts difficult to separate, and the direct engagement avoids sandwiching the membranes between tight fitting elements, which would tend to abrade the membranes and increase the possibility of the membranes ripping. While this interlocking provides a positive fastening of the rings to the housing, the rings are easily removed by outwardly flexing their outer resilient legs and pulling the rings from the housing.

As seen in FIG. 4, rings 16 and 20 are substantially identical and so are membranes 14 and 18, except that membrane 18 does not have to have a reflective surface although it can and it has a central aperture 65 therein, whereas membrane 14 is imperforate. Rather than using an elastic membrane 18 a rigid disc-shaped member could be used.

As seen in FIGS. 2, 3 and 5, a support assembly 24 is positioned inside the housing and between the membranes 14 and 18 for supporting an evacuation assembly 22 for partially evacuating the interior of the housing to thereby draw the elastic membrane 14 into the housing into a curved position as seen in FIG. 2.

The support assembly comprises three tubular radially extending struts 68–70, three clips 71–73 for connecting the ends of the struts to the housing, and a central fitting having a main frustoconical body portion 75 and three radially extending cylindrical arms 76–78, each arm being received in an open end of a strut.

Each clip, such as clip 71 shown in FIGS. 2, 3 and 5, is comprised of a curved body portion 80 having a central aperture 81 therein for receiving the end of the strut and a pair of legs 82 and 83 bent from the body portion for a snap-fit on the top and bottom surfaces 34 and 35 of the housing between the inner ribs 36 and 46 and the annular supports 39 and 49.

Advantageously, the struts 68–70 are positioned between the central fitting 74 and the three clips 71–73 at an angle of about 40° for a reflector having a diameter of about 60 inches and are spaced 120° apart.

Centrally located in the body portion 75 of the central fitting 74 is a vertically oriented threaded through bore 85 which threadedly receives a valve tube 87 which is threaded on its exterior except for an unthreaded portion 88 at its bottom. This tube 87 passes through aperture 65 in the second membrane 18 and this membrane aperture 65 is sealed between the bottom of the body portion 75 of the central fitting and a washer 90 which is maintained in position by a tightening nut 91 which is threadedly engaged on the outer threaded surface of tube 87. By rotating the threaded tube 87 relative to the fitting 74 the upper substantially planar annular end 92 of the tube 87 can be selectively positioned longitudinally of the housing.

Advantageously, the reflector 10 is assembled by first placing the struts, central fitting and clips inside the housing and connecting the clips directly to the housing as shown in FIG. 2. Then, the second ring 20 and the second membrane 18 can be snapped on to the bottom of the housing with threaded tube 87, carried by the central fitting, being received in aperture 65 in membrane 18. Then, the washer 90 and nut 91 can be placed on tube 87. Finally, the reflective assembly formed by reflective membrane 14 and ring 16 can be snapped on the top of the housing.

The bottom unthreaded portion 88 of tube 87 is connected to a conduit 93 which is in turn connected to an adjustable valve 94 which is in turn connected via a second conduit 95 to a vacuum pump 96.

In operation, the pump 96 is activated to draw air out of the interior of the housing along tube 87, conduit 93, valve 94 and conduit 95. The flow of evacuated air can be adjusted by adjustable valve 94. As seen in FIG. 2, the partial vacuum created in the housing interior draws the elastic membrane 14 into the housing to assume a curved position for reflecting and concentrating electromagnetic radiation, such as solar radiation. Membrane 18 can also be drawn upwardly into the housing although this is not shown for reasons of clarity.

The membrane 14 will be drawn or deflected into the housing until it contacts the top end 92 of tube 87 at which time the membrane closes off the flow passageway in the hollow tube. Thus, the combination of the membrane 14 and the tube 87 with its substantially planar upwardly facing top end 92 act as a valve. Once the membrane contacts the upper end 92 it will not be further drawn into the housing and thus its focal length is fixed. To vary the depth of the membrane 14 relative to the housing and therefore its focal length, threaded tube 87 can be threaded upwardly or downwardly relative to the central fitting 74.

As is evident from FIGS. 4 and 5, the membrane 14 and ring 16 combination can be very quickly and easily connected to or removed from the housing by means merely of a snap-fit connection. Thus, if the membrane 14 is damaged or during initial construction of an overall solar concentrator system, the membrane and ring are easily replaced or installed. A similar easy replacement of the second membrane 18 and second ring 20 is advantageously provided by means of the snap-fit thereof.

While one advantageous embodiment has been chosen to illustrate the invention, it will be understood by those skilled in the art that various changes and modifications can be made therein without departing from the scope of the invention as defined in the appended claims.

What is claimed is:
1. A reflector comprising:
an annular housing having an open end;
a ring;
a reflective, elastic membrane spanning the interior of said ring;
means for attaching said membrane to said ring in a gas-tight manner;
releasable fastening means, on said ring and said housing, for coupling said ring to said housing to close said open end in a gas-tight manner and for positively interlocking said ring and housing to prevent accidental relative axial movement therebetween; and
means, coupled to said housing, for evacuating the interior of said housing to thereby draw said reflective membrane into said housing, said releasable fastening means comprising
  a pair of downwardly facing and radially extending locking shoulders coupled to said housing, and
  a pair of upwardly facing and radially extending locking shoulders coupled to said ring,
    each of said upwardly facing locking shoulders being interlocked with one of said downwardly facing locking shoulders.

2. A reflector according to claim 1, wherein said fastening means comprises
  an upwardly projecting annular member coupled to said housing, and
  a pair of spaced, downwardly projecting annular members coupled to said ring for directly receiving and engaging said upwardly projecting annular member therebetween.

3. A reflector according to claim 1, wherein said fastening means comprises
  a pair of spaced, downwardly projecting annular legs coupled to said ring.

4. A reflector according to claim 3, wherein said fastening means further comprises
  an upwardly projecting annular member coupled to said housing.

5. A reflector according to claim 1, wherein
  said ring is formed of resilient material and has a pair of downwardly projecting, spaced annular legs integrally formed therewith and forming part of said fastening means.

6. A reflector according to claim 1, wherein
  said means for attaching said membrane to said ring comprises an ultrasonic weld.

7. A reflector according to claim 1, wherein
  said housing has a second open end; and
  said reflector further comprises
    a second ring,
    a second elastic membrane,
    second means for attaching said second membrane to said second ring, and
    second fastening means, on said second ring and said housing, for releasably fastening said second ring to said housing to close said second open end in a gas-tight manner.

8. A reflector comprising:
  an annular housing having an open end;
  a ring;
  a reflective, elastic membrane spanning the interior of said ring;
  means for attaching said membrane to said ring in a gas-tight manner;
  releasable fastening means, on said ring and said housing, for coupling said ring to said housing to close said open end in a gas-tight manner and for positively interlocking said ring and housing to prevent accidental relative axial movement therebetween; and
  means, coupled to said housing, for evacuating the interior of said housing to thereby draw said reflective membrane into said housing,
  said fastening means comprising an upwardly projecting annular member coupled to said housing and having a portion with a trapezoidal cross section.

9. A reflector comprising:
  an annular housing having an open end;
  an upwardly projecting annular member coupled to said housing and having a pair of downwardly facing and radially extending annular locking shoulders;
  a ring;
  a reflective, elastic membrane spanning the interior of said ring;
  means for attaching said membrane to said ring in a gas-tight manner;
  a pair of spaced, downwardly projecting resilient annular members coupled to said ring and having respectively on each an upwardly facing and radially extending annular locking shoulder; and
  means, coupled to said housing, for evacuating the interior of said housing,
  said upwardly projecting member being receivable between said pair of downwardly projecting members in a snap-fit so that said upwardly facing and downwardly facing locking shoulders releasably engage, thereby closing said open end of said housing in a gas-tight manner and fastening said ring to said housing.

10. A reflector assembly for releasable snap-fit engagement with an annular housing, the combination comprising:
  a ring;
  a reflective, elastic membrane spanning the interior of said ring;
  means for attaching said membrane to said ring in a gas-tight manner; and
  a downwardly projecting resilient annular member coupled to said ring,
  said annular member having an upwardly facing and radially extending locking shoulder,
  said locking shoulder being located below said means for attaching said membrane to said ring.

11. A reflector assembly according to claim 10, wherein
  said locking shoulder is annular.

12. A reflector assembly according to claim 10, wherein
  said means for attaching comprises an ultrasonic weld.

13. A reflector assembly for releasable snap-fit engagement with an annular housing, the combination comprising:
  a ring;
  a reflective, elastic membrane spanning the interior of said ring;
  means for attaching said membrane to said ring in a gas-tight manner; and
  a pair of spaced, downwardly projecting resilient annular members coupled to said ring,
  each annular member having a locking shoulder coupled thereto, extending radially therefrom and facing upwardly towards said ring,
  one of said locking shoulders extending radially inwardly towards the center of said ring, and
  the other of said locking shoulders extending radially outwardly away from the center of said ring.

14. A reflector assembly according to claim 13, wherein
  said locking shoulders are annular,
  said ring has a substantially U-shaped cross section, and
  said membrane is attached to the top of said ring.

15. A reflector assembly according to claim 13, wherein
  said ring has a substantially U-shaped cross section.

16. A reflector assembly for releasable snap-fit engagement with an annular housing, the combination comprising:
   a ring;
   a reflective, elastic membrane spanning the interior of said ring;
   means for attaching said membrane to said ring in a gas-tight manner; and
   a pair of spaced, downwardly projecting resilient annular members coupled to said ring,
   each annular member having a locking shoulder coupled thereto, extending radially therefrom and facing upwardly towards said ring,
   said membrane being attached to the top of said ring.

17. A reflector comprising:
   a tubular housing having an open end;
   a tubular support member;
   a reflective, elastic membrane spanning the interior of said tubular support member;
   means for attaching said membrane to said tubular support member in a gas-tight manner;
   fastening means, on said tubular support member and said housing, for releasably snap-fitting said support member to said housing to close said open end in a gas-tight manner and to prevent accidental relative axial movement therebetween; and
   means, coupled to said housing, for evacuating the interior of said housing to thereby draw said reflective membrane into said housing,
   said releasable fastening means comprising
      an annular locking shoulder coupled to said housing, extending radially thereof and facing downwardly towards said housing, and
      an annular locking shoulder coupled to said ring, extending radially thereof, facing upwardly towards said ring and directly interlocked with said downwardly facing locking shoulder.

18. A reflector according to claim 17, wherein said fastening means releasably snap-fits said support member directly to said housing.

* * * * *